(12) United States Patent
Holmes et al.

(10) Patent No.: US 8,534,965 B2
(45) Date of Patent: Sep. 17, 2013

(54) APPARATUS AND TOOLS FOR USE WITH COMPRESSORS

(75) Inventors: James B. Holmes, Fountain Inn, SC (US); Randall S. Corn, Travelers Rest, SC (US); John W. Herbold, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 1057 days.

(21) Appl. No.: 12/547,685

(22) Filed: Aug. 26, 2009

(65) Prior Publication Data

US 2010/0266356 A1 Oct. 21, 2010

Related U.S. Application Data

(60) Provisional application No. 61/170,236, filed on Apr. 17, 2009.

(51) Int. Cl.
*B23B 45/14* (2006.01)
*B23B 47/34* (2006.01)

(52) U.S. Cl.
USPC ............... 408/67; 408/79; 408/126; 408/130

(58) Field of Classification Search
USPC .................. 408/67, 72 R, 79, 124, 126, 129, 408/130
IPC .......... B32B 39/10, 45/14, 47/06, 47/08, 47/20, B32B 47/22, 47/34
See application file for complete search history.

(56) References Cited

U.S. PATENT DOCUMENTS

| 3,880,047 | A | * | 4/1975 | Dosier | 409/134 |
|---|---|---|---|---|---|
| 4,096,614 | A | | 6/1978 | Brungard et al. | |
| 4,250,775 | A | | 2/1981 | Jerue | |
| 4,329,094 | A | | 5/1982 | Cooley | |
| RE31,627 | E | * | 7/1984 | Evans | 74/89.31 |
| 4,464,976 | A | * | 8/1984 | Tyler | 91/365 |
| 4,494,895 | A | * | 1/1985 | Leaf | 408/236 |
| 4,740,120 | A | * | 4/1988 | Wickham et al. | 408/130 |
| 5,332,343 | A | * | 7/1994 | Watanabe et al. | 409/136 |
| 5,482,411 | A | | 1/1996 | McGlasson | |
| 7,024,744 | B2 | | 4/2006 | Martin et al. | |
| 7,029,371 | B1 | | 4/2006 | Bird | |
| 7,192,223 | B2 | * | 3/2007 | Chun et al. | 408/137 |

(Continued)

FOREIGN PATENT DOCUMENTS

DE 2853488 A1 2/1980

OTHER PUBLICATIONS

Search Report from corresponding EP Application No. 10173265.9-1262 dated Nov. 3, 2011.

*Primary Examiner* — Eric A Gates
*Assistant Examiner* — Michael Vitale
(74) *Attorney, Agent, or Firm* — James W. Pemrick; Ernest G. Cusick; Frank A. Landgraff

(57) ABSTRACT

A tool is provided for use in at least one of drilling, tapping, back spot facing and counter-boring at least one hole. The tool includes a servo motor cutting device and a gearbox. The servo motor cutting device and gearbox rotate a cutting tool to create the hole. A drill unit skid is adapted to engage a hook fit slot in the case of the dynamoelectric machine and supports the servo motor drill and gearbox.

15 Claims, 8 Drawing Sheets

(56) References Cited

U.S. PATENT DOCUMENTS

| | | |
|---|---|---|
| 7,207,203 B2 | 4/2007 | Corn |
| 2005/0198821 A1 | 9/2005 | Reville |
| 2007/0079506 A1 | 4/2007 | Gautreau et al. |
| 2008/0115648 A1 | 5/2008 | Sherlock et al. |
| 2008/0118352 A1 | 5/2008 | Wheeler et al. |

* cited by examiner

APPARATUS AND TOOLS FOR USE WITH COMPRESSORS

CROSS-REFERENCE TO RELATED APPLICATIONS

This application claims priority to U.S. Provisional Application Ser. No. 61/170,236, titled "Apparatus And Tools For Use With Compressors" and filed on Apr. 17, 2009.

BACKGROUND OF THE INVENTION

The present invention relates to compressors and particularly relates to apparatus for repairing or upgrading components in compressors.

In axial flow compressors, stator vanes alternate with rotating blades or buckets in the various stages of the compressor. The stator vanes are circumferentially spaced one from the other about the compressor axis and are secured to the upper and lower compressor casing halves. The upper and lower casing halves are joined one to the other at the compressor midline and provide a complete circumferential array of stator vanes for each compressor stage. As each rotating blade mounted on the rotor completes each revolution at a given rotational velocity, the rotating blade receives aerodynamic excitation pulses from each stator vane. This pulse can be generated from the wake of the upstream stator vane or the bow wave of the downstream stator vane. It is also possible to generate excitations in the rotating blade from differences between the upstream and downstream stator vane counts. These pulses induce a vibratory response in the rotating blade that can be deleterious to the rotating blade causing failure due to high cycle fatigue.

Typically the stator vane or blade count in the upper and lower halves of the compressor casing for a given stage are equal in number to one another. For example, in an initial stage S0 of a given compressor, the blade count for the stator vanes in each of the upper and lower compressor casing halves may be 24/24. In the next stage S1, the blade count may be 22/22. The first number represents the number of stator vanes in the upper casing half and the second number represents the number of stator vanes in the lower casing half of the same stage. The total stator vane count in S0 and S1 is therefore forty-eight and forty-four stator vanes respectively. However, because of the vibratory responses of the rotating blades, non-uniform vane spacings between upper and lower casing halves have been used in the past. Thus, different and alternative upper and lower blade counts in succeeding stages have been provided to reduce or eliminate the vibratory response. For example, in one compressor, stages S0 and S1 have had vane counts of 24/23 and 23/24, respectively. These non-uniform blade counts have been used in original equipment manufacture.

There are, however, a significant number of compressors in use in the field where there is an equal number of stator vanes in the upper and lower compressor halves for given stages. Certain other compressors in the field have an unequal number of stator vanes in the upper and lower compressor halves with adjacent stages, e.g. S0 and S1, having equal numbers of blades but alternate blade counts between the upper and lower halves of the compressor casing. Changing blade counts in the field was not previously considered practical since costly removal of the rotor in the field was required.

Because the rotor is closely fitted to the middle and aft (or rearward) sections of the compressor, it is geometrically difficult to reach the areas where the blades reside or to drill, tap, and counter-bore load dam pin holes in the area desired. Additionally, the current known methods for removal of these blades increase the likelihood that the rotor, stator blades or adjacent hardware may be damaged during the removal process. Moreover, the extended reach and limited access to the stator blades being removed underneath the rotor and rotor blades creates an ergonomic issue potentially leading to operator injury.

BRIEF DESCRIPTION OF THE INVENTION

In accordance with an aspect of the present invention, A tool is provided for use in at least one of drilling, tapping, back spot facing and counter-boring at least one hole. The tool includes a servo motor cutting device and a gearbox. The servo motor cutting device and gearbox rotate a cutting tool to create the hole. A drill unit skid is adapted to engage a hook fit slot in the case of a dynamoelectric machine and supports the servo motor drill and gearbox.

In accordance with another aspect of the present invention, a tool is provided for use in at least one of drilling, tapping, back spot facing and counter-boring at least one hole in a case of a dynamoelectric machine. The tool includes a servo motor drill and a gearbox. A drill unit skid is configured to engage a hook fit slot in the case of the dynamoelectric machine and for supporting the servo motor drill and gearbox. The servo motor drill and gearbox rotate a drill bit to create the hole.

DETAILED DESCRIPTION OF THE INVENTION

Figure 1:
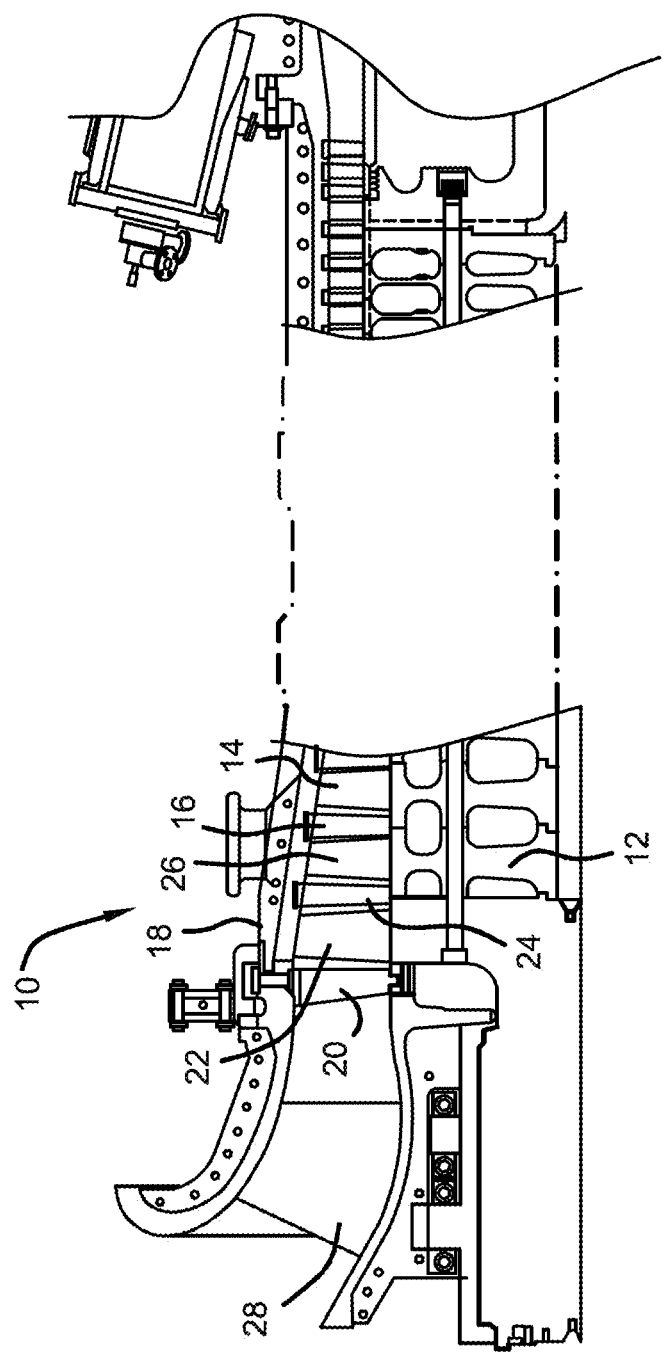
FIG. 1 is a schematic illustration with parts broken out for clarity of the upper half of a compressor illustrating various compressor stages.

Referring to FIG. 1, there is illustrated an upper half of a compressor generally designated 10. Compressor 10 includes a rotor 12 mounting buckets or blades 14 for rotation about the axis of the compressor and stator vanes 16 fixed to the upper casing half 18. It will be appreciated that the blades 14 of the rotor are circumferentially spaced one from the other about the rotor axis and that the stator vanes 16 are similarly circumferentially spaced one from the other about the axis. The vanes and buckets form various stages of the compressor. For example, the vanes 20 and buckets 22 constitute compressor stage S0 while the vanes 24 and buckets 26 constitute stage S1. Inlet guide vanes 28 are also illustrated in FIG. 1.

Figure 2:
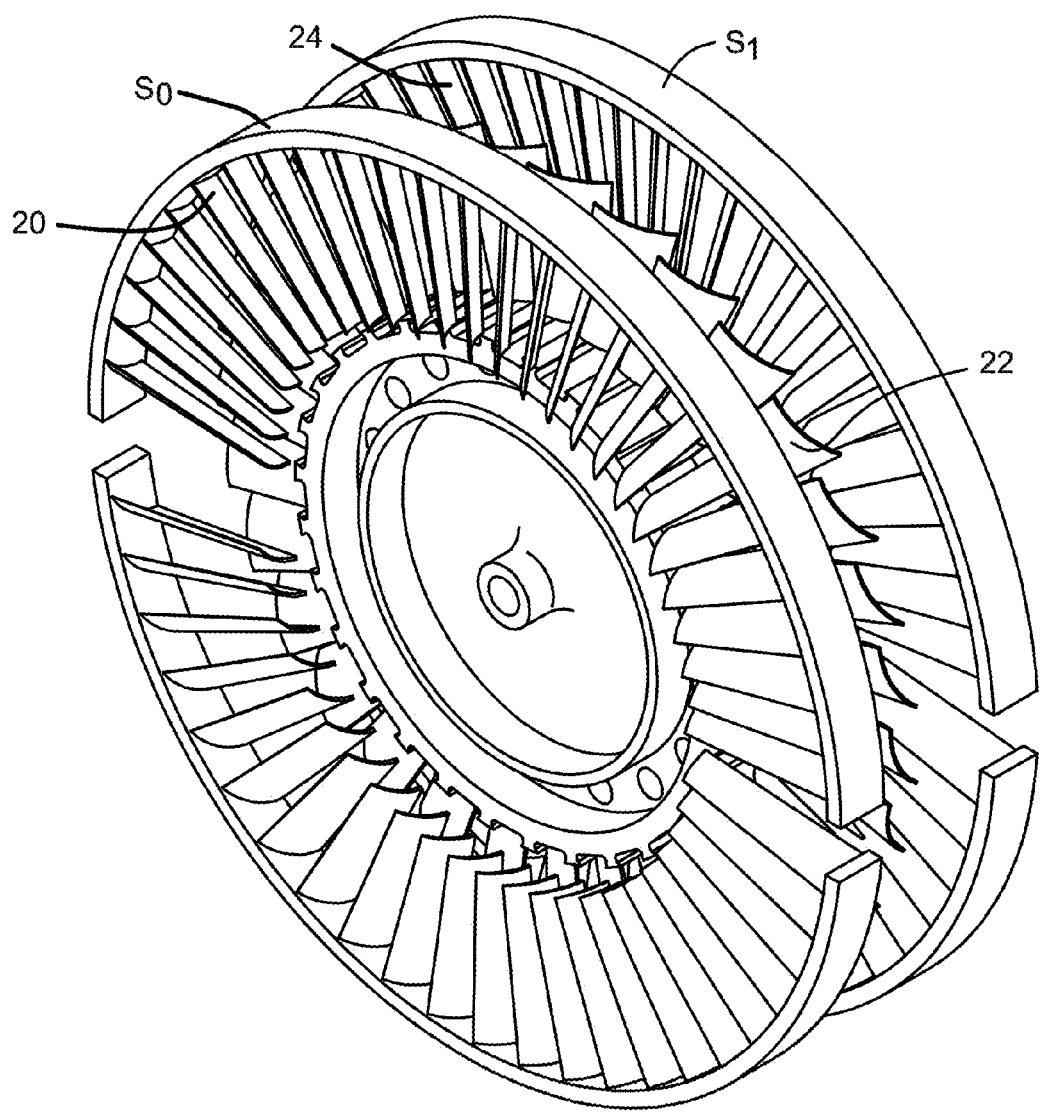
FIG. 2 is a perspective view of stage S0 and stage S1 with rotating blades or buckets therebetween, illustrating the different blade counts in the upper and lower compressor halves of these stages.
Figure 3:
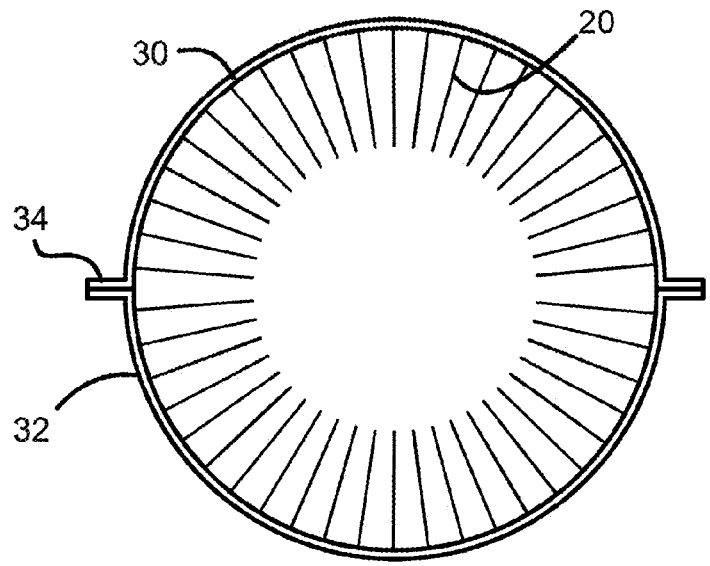
FIG. 3 is a schematic end view illustrating a compressor having an equal stator vane count in both upper and lower halves of the compressor stage.
Figure 4:
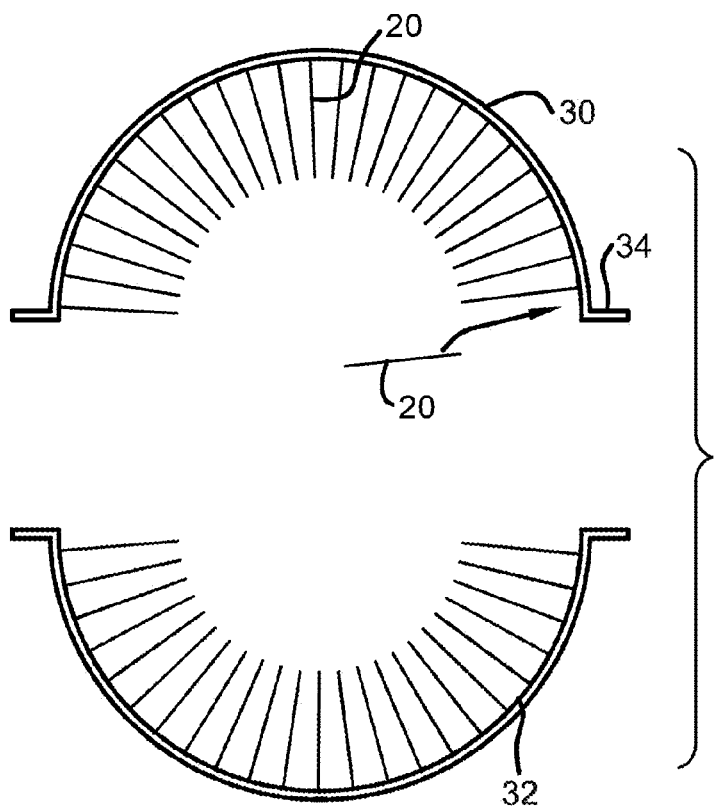
FIG. 4 is a schematic illustration of the removal of the upper compressor half.

Referring to FIG. 2, there is schematically illustrated the stator vanes 20 of stage S0 and the stator vanes 24 of stage S1. The buckets 22 mounted on the rotor 12 are illustrated disposed between the stator vanes 20 and 24. The stator vanes 20 and 24 as well as stator vanes of other stages are typically attached to the upper and lower casing halves, schematically illustrated at 30 and 32 respectively in FIGS. 3 and 4. The upper and lower halves of the compressor casing may be secured at the horizontal midline to one another by bolted flanges 34 which enable the upper half 30 of the casing to be removed from the lower half 32 with the rotor retained in the lower half. The upper and lower halves of the stator vanes 20 and 24 illustrated in FIG. 2 are shown separated from one another for clarity.

Compressors and their associated components may need to be repaired or upgraded during their service life. In some applications it may be desired to replace stator vanes with vanes having a new shape or profile and/or grouping configuration. Some known processes currently require the removal of the rotor, which significantly increases outage duration and cost. An apparatus, according to aspects of the present invention, utilizes an iterative process for removing single stator blades with the rotor in place. This in-situ process greatly facilitates upgrading or repairing the compressor as the previous known method required removing the rotor.

Figure 5:
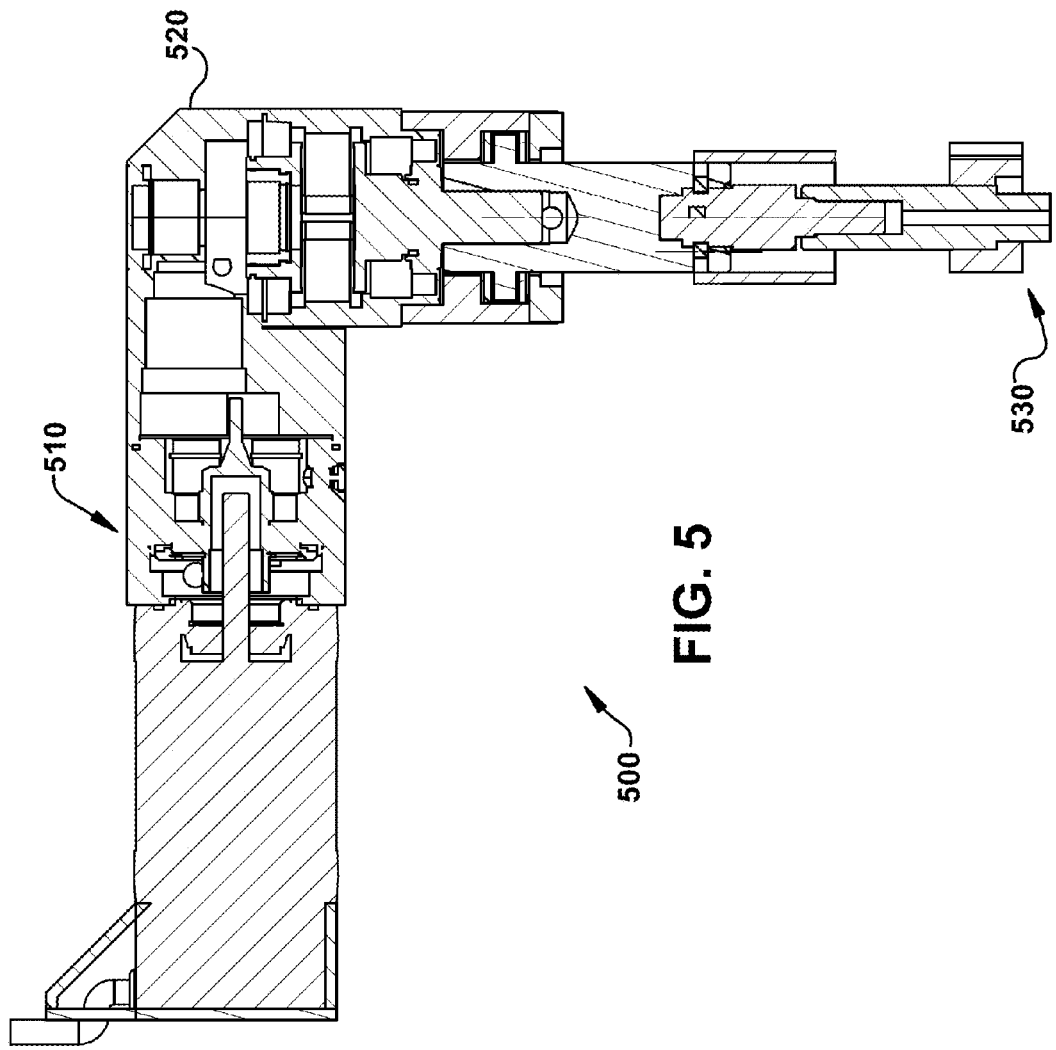
FIG. 5 is a cross-sectional illustration of a tool that can be used to drill, tap, back spot face and counter-bore holes for load dam pins, according to an aspect of the present invention.
Figure 6:
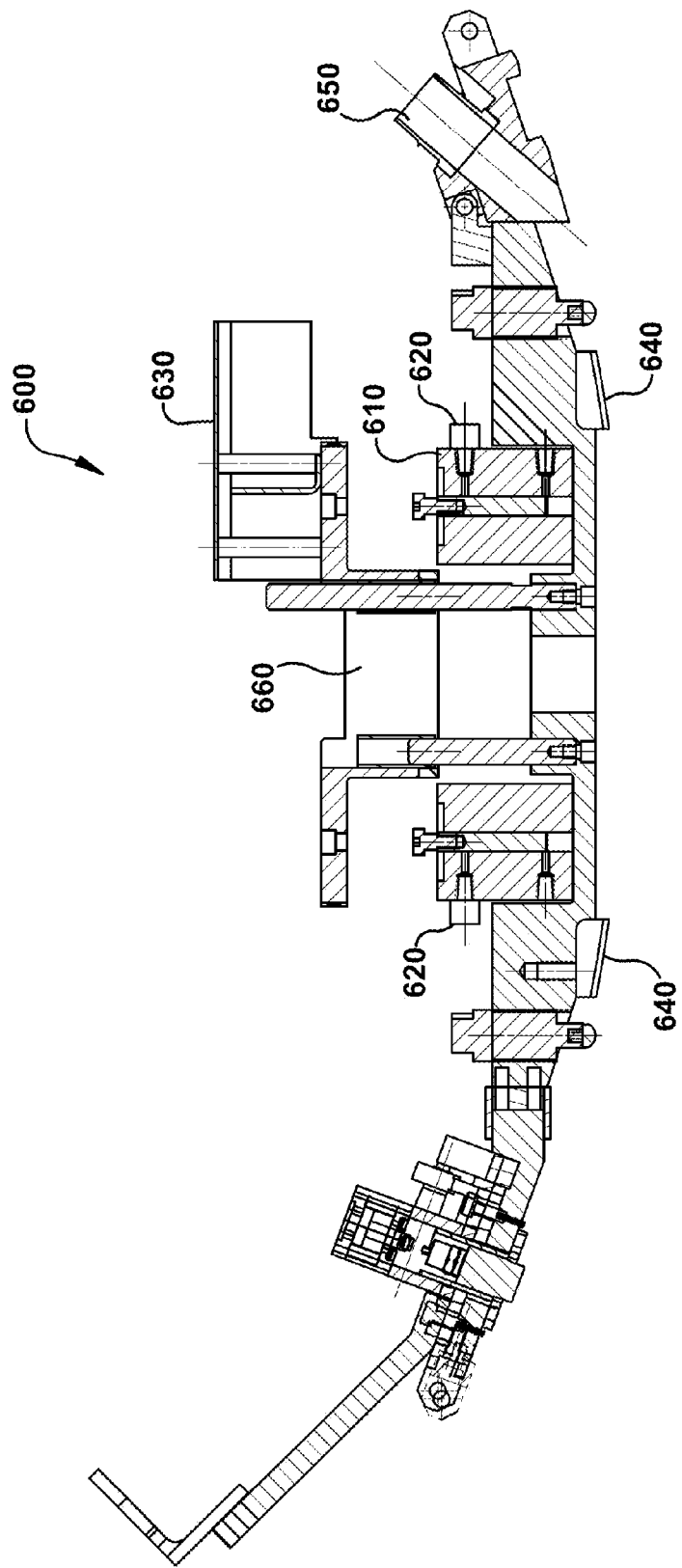
FIG. 6 is a cross-sectional illustration of a drill unit skid that may be used in conjunction with the tool of FIG. 5, according to another aspect of the present invention.
Figure 7:
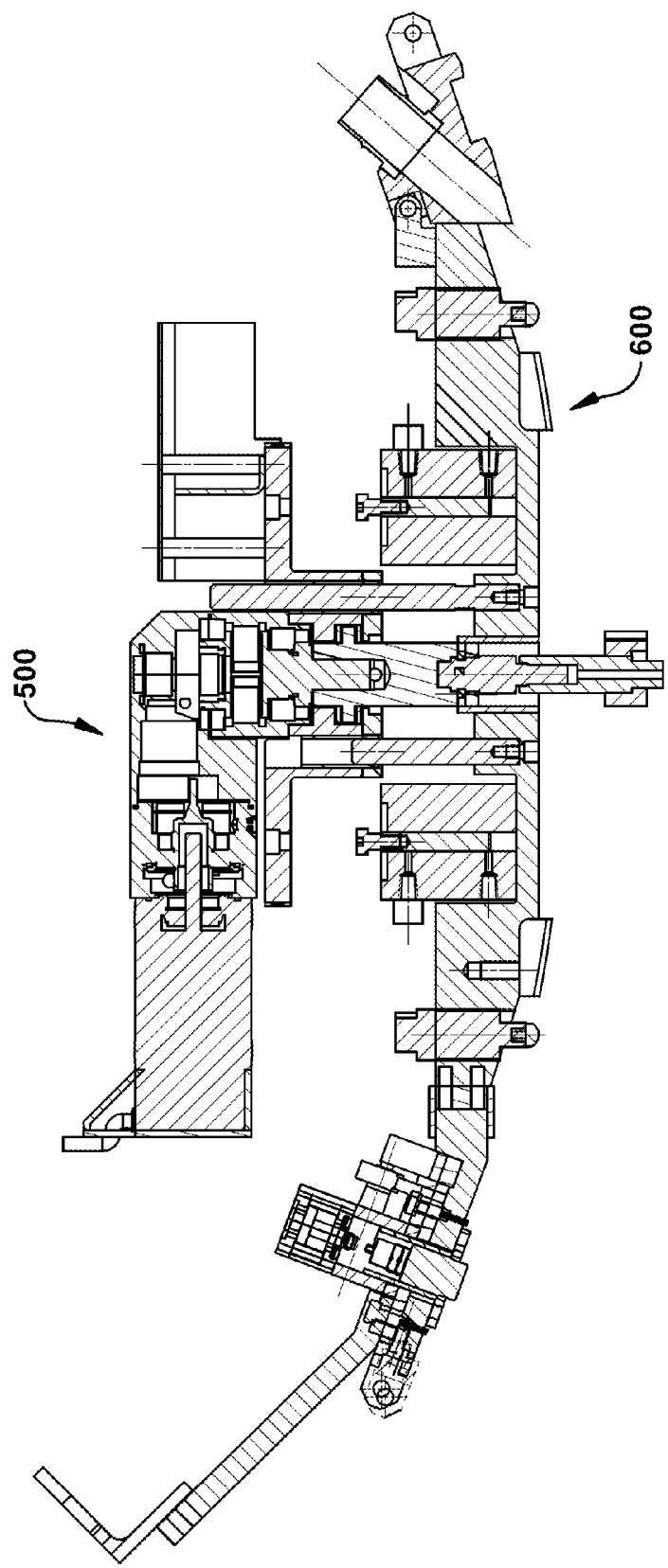
FIG. 7 is a cross-sectional illustration of the tool of FIG. 5 mounted on the drill unit skid of FIG. 6, according to a still further aspect of the present invention.

FIGS. 5-7 illustrate an apparatus, according to aspects of the present invention, that can be used to at least one of drill, tap, back spot face and counter-bore the load dam pin holes in the compressor case with the rotor in place or in-situ. The apparatus or tool may be designed to utilize the hook fit area where the blades reside to locate and navigate the tool during use. The hook fit or "T" slot is an area of the compressor case that is designed to guide and hold the stator vanes or stationary components in their relative position in the compressor. The hook fits can be an array or series of circumferential grooves disposed on the inward surface of the compressor case, and span the various stages of the compressor. This hook fit can vary in size in different portions of the compressor, and may be designed to accommodate segmented as well as single blades. The hook fit positions the stationary components both axially and radially for correct positioning relative to the rotating blades found on the rotor.

After the removal of the stator vanes in the axial compressor portion of a gas turbine, load dam pins may be installed as an upgrade option. According to aspects of the present invention, the holes for the load dam pins may be drilled, tapped, back spot faced and counter-bored with the rotor in place or "in-situ" to allow for the installation of the load dam pins. The purpose of the pins is to equally distribute the aerodynamic load circumferentially at strategic locations for the stator vanes. The tool may be used with any dynamoelectric machine, including, but not limited to compressors, gas turbines or steam turbines.

FIG. 5 illustrates a cross-sectional view of a drill 500, according to an aspect of the present invention, that can be used to drill, tap, back spot face and/or counter-bore the load dam pin holes in the compressor case with the rotor in place or in-situ, thereby significantly reducing outage duration and cost. The drill 500 may utilize a motor 510 and gearbox 520 to spin a drill bit or cutting tool 530, tap, back spot face and counter-bore. The motor 510 may be electrically, hydraulically or pneumatically powered. The drill 500 can use hydraulics or pneumatics (e.g., compressed air) to actuate the drill 500 in the "Z" plane creating the motion to drill and penetrate the compressor case.

The drill unit 500 may be comprised of an electric servo motor 510 attached through an adaptor plate to a right angle gearbox 520. This unit provides the power to perform all cutting operations during the load drilling process. All cutting operations, drilling, back spot facing, counter boring and tapping are achieved through the use of cutting tooling connected to this drill unit. The unit may also be equipped with two hydraulic double acting cylinders that provide the forces necessary to apply pressure to the drill, spot face cutter and tap for advancing and retracting the tooling through the casing material.

In addition to the advance and retracting double acting cylinders the unit may have two hydraulic cylinders that provide the clamping force required to hold the unit radially during the drilling operations. This clamping is accomplished by actuating the cylinders to apply a radial inward force on the drill unit to hold it against the hook fit during the drilling, spot facing and tapping operations. The unit may include another hydraulic cylinder that is attached to a locating or shot pin which when actuated provides the circumferential location of the drill unit by locating in the drill unit mount or in a previously drilled hole.

FIG. 6 illustrates a perspective view of the drill unit skid 600, which may be combined with the drill 500. The drill unit skid 600 can be used with the hook-fit slot to position and retain itself in the axial direction "X" plane relative to the compressor and to accurately locate the holes in the desired location circumferentially in the "Y" position and relative to the horizontal joint. The drill unit skid unit 600 includes an air manifold 610, a number of air supply hose connections 620, a pneumatic or hydraulic drill stroke actuator 630, hook fit slides 640 and vacuum port 650.

A central opening 660 is provided to accept the drill 500. The drill 500 rests on the drill stroke actuator 630 and is configured for movement in the "Z" plane. The vacuum port 650 may be attached to a vacuum device and is utilized to evacuate material generated during the drilling process.

The drill unit skid 600 serves as the mounting fixture for all devices for the drill unit. Some of the notable features are the hook fit slides or feet 640 and clamping actuators. The feet serve two main functions, they guide the skid 600 along the hook fit 833 and position the drill 500 in the axial direction and when the clamping actuators are energized they act as a stop in the radial direction to push against. The feet 640 are sized so that there is enough clearance for the sliding motion needed but not enough to allow the unit to escape the hook fit area in the radial or axial directions. The skid 600 may also be equipped with two attachment points for pinning the operator control/push rods 810 and the vacuum system. Loops may be located on each end of the unit to attach the control/push rods that are used by the operators to push and pull the unit along the hook fit during all operations. On the forward end the loop may be used to attach a vacuum attachment to remove cutting debris and chips generated during the various processes.

The pinning process can be accomplished by mating the rods and vacuum attachment on either end and inserting a ball pin through all pieces and thus attaching the rods and vacuum attachment to the skid. The skid also serves as an attachment point for a protective hose which houses the hydraulic lines that power the unit. This can prevent inadvertent disconnection of the hydraulic hoses from the unit and protects the hydraulic lines from nicks and scuffs during the operation of the unit.

FIG. 7 illustrates a perspective view of the drill 500 mounted on drill unit skid 600. The drill 500 and skid 600 can employ a work rest to lock and retain itself in the circumferential direction while drilling, tapping, back spot facing or counter-boring and all may be executed with the rotor in place or in-situ. The combined unit may also be supplied with a control unit or programmable logic controller (PLC) (not shown). The PLC controls the cutting functions and logic for the drilling operations, and limits drilling, tapping, back spot facing and counter boring activities such as feed speeds and rotation of the drilling head based on operator selection on the operator panel (not shown). This functionality prevents undesired conditions, such as running a tap in the drill mode.

The PLC may also have logic built into it to automatically pulse the drilling operation in such a way as to break the drilling into short bursts to control the length of the drill chips. This logic may help in evacuating the drill chips for the vacuum system (not shown). Too large of a chip cannot be removed by a normal vacuuming operation. The tool may be used with any dynamoelectric machine, including, but not limited to compressors, gas turbines or steam turbines.

Figure 8:
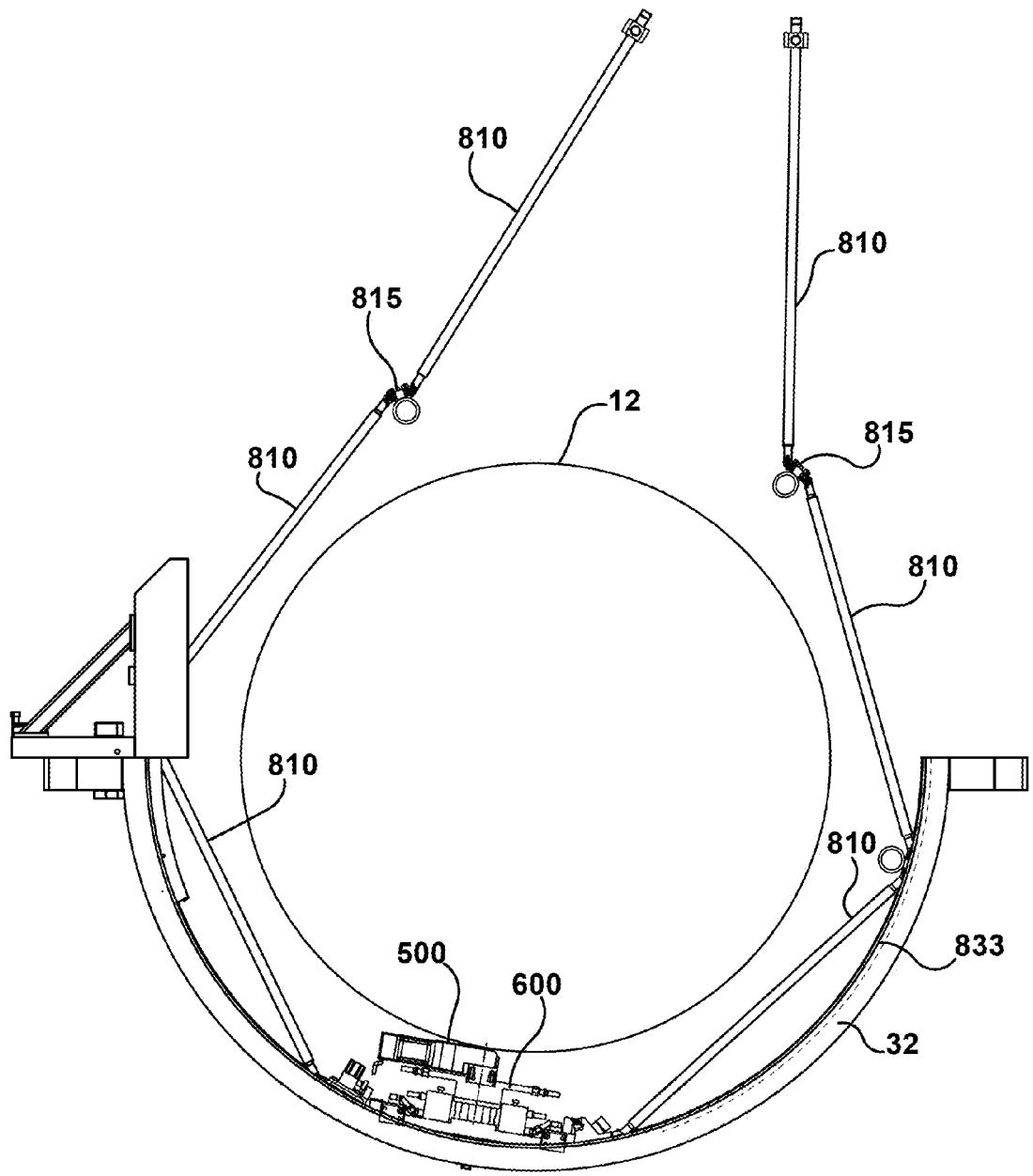
FIG. 8 is a cross-sectional illustration of the tool deployed under a rotor, according to an aspect of the present invention.

FIG. 8 illustrates a cross-sectional view of the tool 500 and skid 600 deployed under a rotor 12 in a compressor. The lower casing half 32 of the compressor contains a series of hook fit slots 833. The drill unit skid 600 slides or navigates along the hook fit slot 833 and may be positioned at any desired location beneath rotor 12. One or more extension arms 810 can be linked together with one or more couplings 815, and the arms 810 are connected to drill unit skid 600. The arms 810 can be manually manipulated to position the drill 500 and skid 600, or the arms can be moved or controlled with the assistance of a machine and/or controller.

Figure 9:
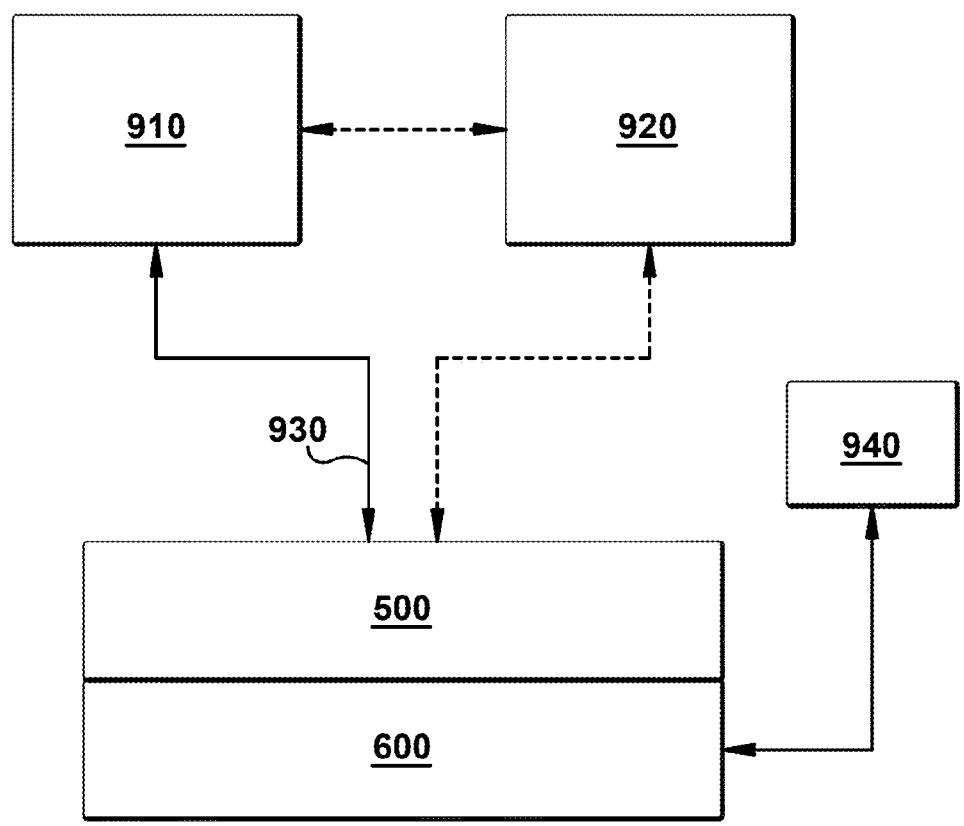
FIG. 9 is a block diagram of a power and control system that may be used in conjunction with the tools of FIG. 5 and FIG. 6, according to an aspect of the present invention.

FIG. 9 illustrates a power and control system that may be used with drill 500 and/or drill unit skid 600. A power source or supply 910 is connected to tools 500 and/or 600 via connection lines 930. The power supply may include electrical power (e.g., AC and/or DC power), pneumatic power (e.g., compressed air), hydraulic power or any other suitable power source. The connection lines 930 may be any suitable device for the transmission of the power (e.g., conductive cables/wires, compressed air hoses/lines, etc.). A control system 920 may be used to control and/or actuate the power supply 910 and/or tools 500, 600, and may comprise computer control devices or manual control devices). In one example, the control device could be a laptop computer having a graphic interface allowing an operator to control the work process. In another example, the control device may be a simple set of manually operated switches or levers that activate or deactivate various features of the power supply 910 and/or tools 500, 600. The control system 920 may be connected to the power source 910 and/or the tools 500, 600 via any suitable communication medium (e.g., wired or wireless communication lines, cables, etc.). A vacuum system 940 may be connected to drill unit skid 600 or drill 500 to aid in the removal of cutting debris.

The method or process, according to aspects of the present invention, begins with installing a mounting fixture to the left side horizontal joint utilizing an alignment block between the fixture and the hook fit of the case. This aligns the drill unit and the hook fit to feed the device into the "T" slot or hook fit of the compressor case. Additionally, the mounting fixture sets the positioning of all holes (e.g., eight) that will be drilling into each half of the case during the process. The fixture does this by utilizing a hole that is located in the base of the fixture. This hole is used to define the location of the first hole to be drilled. Each subsequent hole will be based off of this first hole location. This is achieved by actuating a shot pin, on the drill unit, into the hole in the mounting fixture. The shot pin locates the position of the drill unit circumferentially to the hole being worked and the clamping cylinders provide an upward force to hold the drill in position in the hook fit during all operations (drilling the holes, back spot facing and tapping) during the process.

Prior to mounting the drill on the fixture a bit is installed into the drill. This bit is custom due to the length and machining necessary to lock into the bit chuck. Once installed, the unit is stroked for forward and reverse movement and rotation. Once proven, it is positioned on the mounting fixture. The fixture is equipped with a lock to suspend the drill prior to feeding it into the machine. This lock is utilized for a couple of reasons. The drill is heavy and by suspending it in this position it makes tool change over easier for the operator.

The operator unlocks and slides the drill unit into the hook fit and actuates the shot pin to locate the unit for the first hole position. The shot pin locates the drill unit by utilizing the hole located in the base of the drill mount. Once in the locating hole the operator actuates the hydraulic clamps to hold the drill up against the bottom side of the hook fit. This helps to ensure the unit does not slide or move during the drilling, spot facing and tapping operations. Once the drill is locked into position the operator can choose the function from the pendant that they want to perform. The operator can choose, drill, spot face or tap, advance and retract depending on what operation is needed. The first operation is drilling one of the holes. The operator drills the first hole and then uses this hole to locate the position of the next. This drilling operation is repeated until all eight holes have been drilled. Obviously, any number of holes may be drilled and more or less than eight holes could be chosen, based on the specific application.

Once all holes have been drilled the drill unit can be removed and the operator may select the spot face operation on the pendant. The split arbor is installed for the back spot facing operation. The arbor is split due to the limited amount of stroke range of the drilling unit. The first half of the split arbor is locked into the drill and the unit is fed into the hook fit the same way as during the drilling operation. Once the unit is at the first hole location and locked into place the drill is stroked or advanced to the full stroke so that the second half of the arbor can be attached. This is achieved by feeding the second half of the arbor through the hole that was previously drilled. Once in place the arbor is tightened using a cap screw. Next, the back spot face cutter is attached to the arbor. This arbor cutter arrangement is designed so that when the cutter is rotating (cutting) the rotational direction keeps it locked into position. The drill unit is then retracted to the "fully" retracted position. This is what sets the depth of the spot face drilling operation. When the unit is fully retracted the spot face is to the correct depth. This is an important depth since this surface sets the location of the load pin and the load pin to stator blade relationship. The drill is then advanced full stroke and the spot face cutter and arbor are removed. The unit is then unclamped and moved to the next hole location. This process can be repeated until all holes have been spot faced. Once all holes are spot faced the drill unit may be removed from the machine for a tooling change.

The next operation is the tapping of the holes. The operator selects the tapping operation on the pendant. The custom tap is loaded and locked into the drilling unit while the drill is suspended on the mounting fixture. The tap is designed to fit into the chuck and it pushes the tapping chips forward unlike a conventional tap. The drill is then fed into the machine and is advanced to the last (e.g., eighth) hole location to start the tapping process. The tapping operation is started at the last hole due to the shot pin requiring an untapped or smooth hole to locate from during the process. The tapping operation starts with the last hole and works backwards towards the first hole. Once the last hole is tapped the drill unit is pulled back to tap the next (e.g., seventh) hole. This is repeated until all holes have been tapped. The drill unit is then disassembled and mounted on the upper half casing where all operations can be repeated.

It will be appreciated that the removal of the upper casing half of the compressor to add, repair or upgrade the compressor does not require the removal of the rotor 12 from the lower casing half 32. This enables the compressor to be modified in the field or in situ.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for use in drilling, tapping, and back spot facing at least one hole in a dynamoelectric machine, said tool comprising:
    a servo motor cutting device, wherein the servo motor cutting device is at least one of electrically powered, hydraulically powered and pneumatically powered;
    a gearbox;
    a drill unit skid, the drill unit skid adapted to engage a hook fit slot in a case of a dynamoelectric machine and for supporting the servo motor cutting device and the gearbox, the drill unit skid including hook fit slides, the hook fit slides configured to guide the drill unit skid along the hook fit slot and act as a stop in a radial direction;
    a vacuum port for connection to a vacuum system, the vacuum port for aiding in removal of cutting debris;
    wherein said servo motor cutting device and said gearbox rotate a cutting tool to create said at least one hole, and wherein a rotor of the dynamoelectric machine is left in place during drilling, tapping and back spot facing.

2. The tool of claim 1, said drill unit skid further comprising:
    a manifold;
    a drill stroke actuator; and
    power supply means for powering said tool.

3. The tool of claim 2, said power supply means comprising compressed air and at least one air hose for transporting said compressed air.

4. The tool of claim 2, said power supply means comprising at least one of a hydraulic system and a pneumatic system.

5. The tool of claim 2, wherein said dynamoelectric machine is chosen from one or more of:
    a compressor, a gas turbine and a steam turbine.

6. The tool of claim 1, wherein said at least one hole is drilled for a load dam pin.

7. The tool of claim 6, wherein said tool is used to drill, tap, back spot face and counter-bore said at least one hole for said load dam pin.

8. A tool for use in drilling, tapping, and back spot facing at least one hole in a case of a dynamoelectric machine, said tool comprising:
    a servo motor drill;
    a gearbox;
    a drill unit skid configured to engage a hook fit slot in the case of said dynamoelectric machine and for supporting said servo motor drill and said gearbox, the drill unit skid including hook fit slides configured to guide the drill unit skid along the hook fit slot and act as a stop in a radial direction;
    wherein said servo motor drill and said gearbox rotate a drill bit to create said at least one hole, the dynamoelectric machine chosen from one or more of a compressor, a gas turbine and a steam turbine, and wherein the servo motor drill is powered by at least one of an electrical system, a hydraulic system and a pneumatic system; and
    wherein a rotor of the dynamoelectric machine is left in place during the drilling, tapping and back spot facing.

9. The tool of claim 8, said drill unit skid further comprising a vacuum port for connecting to a vacuum system, said vacuum port for aiding in removal of cutting debris.

10. The tool of claim 9, said drill unit skid further comprising:
    a manifold;
    a drill stroke actuator; and
    power supply means for powering said tool.

11. The tool of claim 10, wherein said drill stroke actuator is at least one of electrically powered, hydraulically powered and pneumatically powered.

12. The tool of claim 11, wherein said at least one hole is drilled for a load dam pin.

13. The tool of claim 12, further comprising a control system connected to said tool, said control system for controlling operation of said tool.

14. A tool for use in drilling, tapping, and back spot facing at least one hole in a dynamoelectric machine, the at least one hole configured for a load dam pin, wherein the tool is configured so that a rotor of the dynamoelectric machine is left in place during the drilling, tapping and back spot facing, the tool comprising:
    a servo motor drill powered by at least one of an electrical system, a hydraulic system and a pneumatic system;
    a gearbox connected to the servo motor drill;
    a drill unit skid configured to engage a hook fit slot in the case of the dynamoelectric machine and for supporting the servo motor drill and the gearbox, the drill unit skid including hook fit slides configured to guide the drill unit skid along the hook fit slot and act as a stop in a radial direction, the drill unit skid further comprising a vacuum port for connecting to a vacuum system and for aiding in removal of cutting debris, a manifold, the drill unit skid including a drill stroke actuator and power supply means for powering the tool; and
    wherein the servo motor drill and the gearbox are configured to rotate a bit to create the at least one hole, the dynamoelectric machine chosen from one or more of a compressor, a gas turbine and a steam turbine.

15. The tool of claim 10, said power supply means comprising compressed air and at least one air hose for transporting said compressed air.

* * * * *